D. S. MICHIE.
BRAKE MECHANISM.
APPLICATION FILED APR. 26, 1915.

1,177,125.

Patented Mar. 28, 1916.
2 SHEETS—SHEET 1.

Witnesses:
C. Feinle, Jr.
John J. McPatty

Inventor,
Donald S. Michie.
By Victor J. Evans,
Attorney.

D. S. MICHIE.
BRAKE MECHANISM.
APPLICATION FILED APR. 26, 1915.

1,177,125.

Patented Mar. 28, 1916.
2 SHEETS—SHEET 2.

Witnesses:
C. Feinle, Jr.
John J. McCarthy

Inventor,
Donald S. Michie.
By Victor J. Evans,
Attorney.

UNITED STATES PATENT OFFICE.

DONALD S. MICHIE, OF CASPER, WYOMING.

BRAKE MECHANISM.

1,177,125.  Specification of Letters Patent.  Patented Mar. 28, 1916.

Application filed April 26, 1915. Serial No. 24,024.

*To all whom it may concern:*

Be it known that I, DONALD S. MICHIE, a citizen of the United States of America, residing at Casper, in the county of Natrona and State of Wyoming, have invented new and useful Improvements in Brake Mechanism, of which the following is a specification.

This invention relates to improvements in brake mechanism for revolving shafts or axles and has particular application to brake mechanism for use on motor vehicles, railway cars and the like.

In carrying out the present invention, it is my purpose to provide brake mechanism which may be readily and quickly placed in operation and wherein the braking effect will be increased after the mechanism has been initially operated and is influenced by the revolving shaft or axle.

It is also my purpose to improve and simplify the general construction of brake mechanism and to provide mechanism which will operate efficiently and effectively for its intended purpose and wherein the component parts will be so correlated and arranged as to reduce the possibility of derangement to a minimum.

With the above and other objects in view, the invention consists in the construction, combination and arrangement of parts hereinafter set forth in and falling within the scope of the claims.

Figure 1:
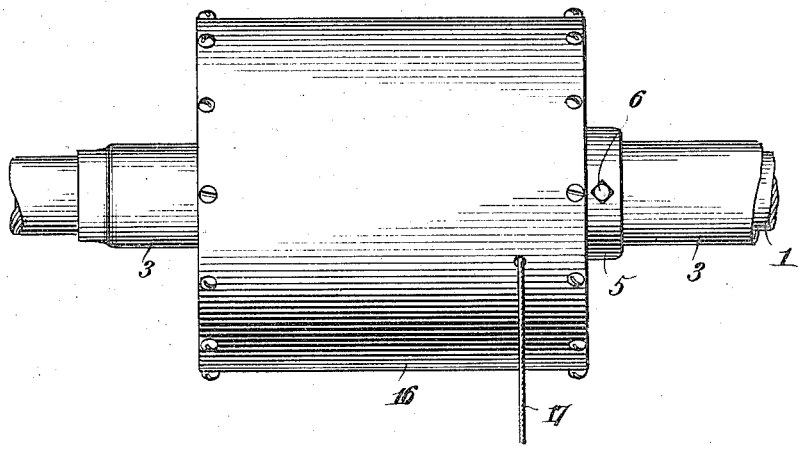
Figure 2:
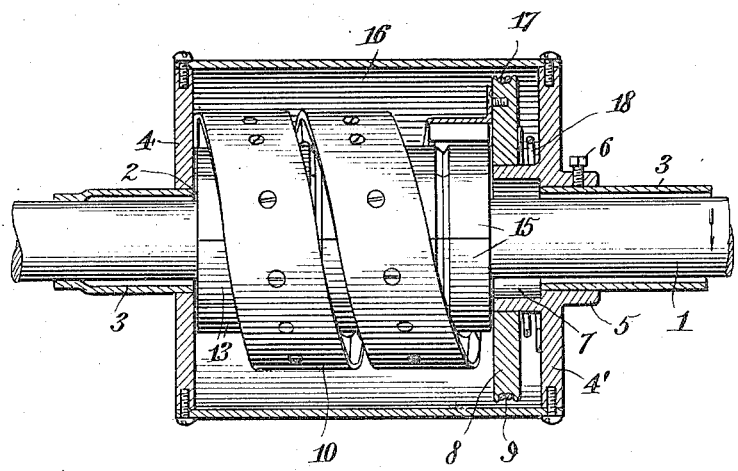
Figure 3:
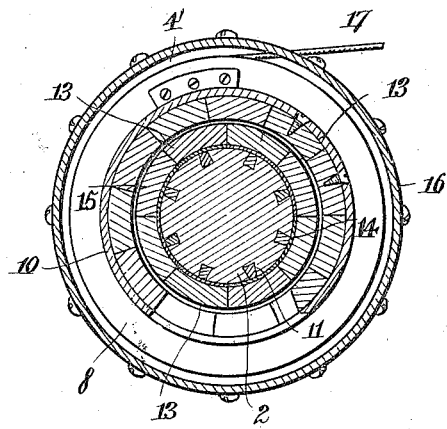
Figure 4:
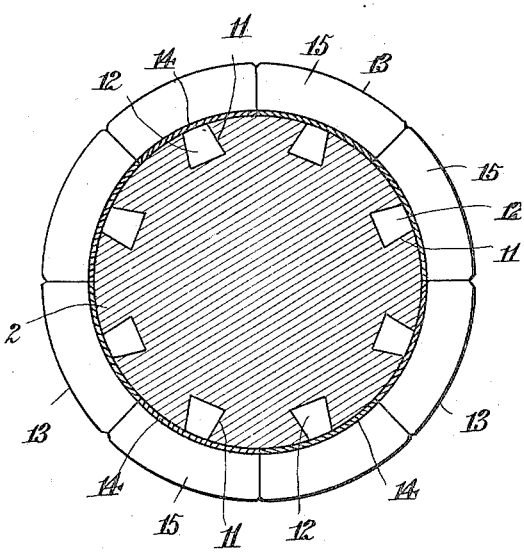
Figure 5:
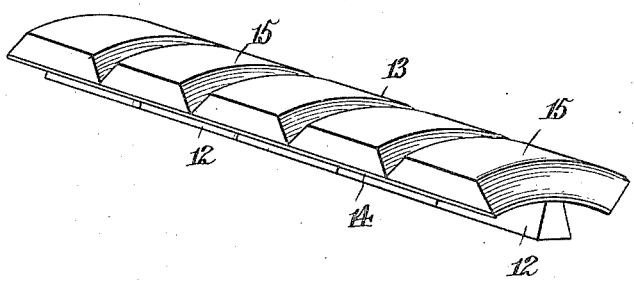
Figure 6:
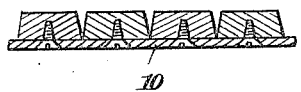

In the accompanying drawings: Figure 1 is a plan view of brake mechanism constructed in accordance with the present invention, the same being shown as applied to a vehicle axle. Fig. 2 is a longitudinal sectional view through the brake apparatus. Fig. 3 is a transverse sectional view therethrough. Fig. 4 is an enlarged cross sectional view taken in a plane parallel with Fig. 3. Fig. 5 is a plan view of one of the sections of the brake drum. Fig. 6 is a fragmentary longitudinal sectional view through the brake band.

Referring now to the drawings in detail, 1 designates an axle or shaft capable of rotation. Fixed to the shaft or axle 1 and rotatable therewith is a brake drum 2, while surrounding the shaft or axle 1 at opposite sides of the brake drum are sleeves 3 forming a casing or housing for the axle 1. Fixed to one sleeve 3 is a disk 4 disposed concentrically of the axle and stationary relatively thereto, while mounted on the remaining sleeve 3 in proximity to the end of the drum 2 is a disk 4' formed with a hub collar 5 fixed to the sleeve 3 by means of one or more set screws 6 whereby the disk 4' is held to the sleeve 3 against movement. Formed on the inner surface of the disk 4' and projecting inwardly therefrom is a circular flange 7, while loosely surrounding the flange 7 is a disk 8 having the periphery thereof formed with a groove 9. This disk 8 is of less diameter than the adjacent disk 4'. Surrounding the drum 2 is a spiral brake band 10 having one end fastened to the stationary disk 4 and the other extremity secured to the movable disk 9.

In the present instance, the periphery of the drum 2 is provided with longitudinally extending dove-tailed grooves 11 spaced apart equidistant and disposed within these grooves 11 are similarly shaped tongues 12 carried by longitudinally extending sections 13. Each section 13 comprises a flexible strip 14 and a number of shoes 15 secured to the under surface of the strip 14 and arranged longitudinally thereof.

Secured to the peripheries of the disks 4 and 4' are the ends of a cylindrical casing 16 surrounding the drum 2 and the spiral brake band 10 and formed in the casing 16 adjacent to the periphery of the disk 8 and at a tangent to the latter is an opening. Secured within the groove 9 and wrapped about the disk 8 is one end portion of a cable 17 or other flexible element, the remaining end of the cable being passed through the opening in the casing 16 and disposed within convenient reach of the operator of the brake.

In practice, when the shaft or axle 1 is revolving and it is desired to apply the brake to check the speed thereof, a pull is exerted upon the cable 17, thereby revolving the disk 8 and in the rotation of the disk 8 the spiral brake band 10 is contracted and grips the shoes 15 on the outer surface of the drum 2 and as the drum continues to rotate under the action of the shaft 1, such drum tends to wind up the spiral brake band 10, thereby increasing the braking effectiveness of the band so as to bring the shaft or axle to a stop in a short period of time. To release the brake the cable 17 is relieved of the pulling influence. Surrounding the flange 7 is a restoring spring 18 having one end secured to the stationary disk 4' and the remaining end secured to the movable disk 8 and this spring acts to restore the disk 8 to non-breaking position when the cable 17 is released.

When it is desired to remove one or more of the sections 13 so as to repair or replace the same, the set screws 6 are loosened and the disks 4' and 8 move longitudinally along the sleeve, thereby exposing the adjacent end of the drum 2 so that the shoe carrying the sections may be removed therefrom.

While I have herein shown and described the preferred form of my invention by way of illustration, I wish it to be understood that I do not limit or confine myself to the precise details of construction herein described and delineated, as modification and variation may be made within the scope of the claims without departing from the spirit of the invention.

I claim:

1. In brake mechanism, a rotatable axle, a drum fixed on said axle, sleeves surrounding said axle at opposite sides of said drum, a disk at one end of said drum fixed to one of said sleeves, a disk at the opposite end of said drum fixed to the remaining sleeve, a movable disk carried by the last-mentioned disk disposed adjacent to the drum, a spiral brake band surrounding said drum and having one end fixed to said stationary disk and the remaining end fixed to said movable disk, and means for rotating said movable disk to engage said brake band with said drum.

2. In brake mechanism, a rotatable axle, a drum fixed on said axle, sleeves surrounding said axle at opposite sides of said drum, a disk at one end of said drum fixed to one of said sleeves, a disk at the opposite end of said drum fixed to the remaining sleeve, a movable disk carried by the last-mentioned disk disposed adjacent to the drum, a spiral brake band surrounding said drum and having one end fixed to said stationary disk and the remaining end fixed to said movable disk, means for rotating said movable disk to engage said brake band with said drum, and a cylindrical casing surrounding said drum and brake band and having the ends thereof surrounding and secured to said stationary disk.

3. In brake mechanism, a rotatable axle, a drum fixed on said axle, sleeves surrounding said axle at opposite sides of said drum, a disk at one end of said drum fixed to one of said sleeves, a disk at the opposite end of said drum fixed to the remaining sleeve, a movable disk carried by the last-mentioned disk disposed adjacent to the drum, a spiral brake band surrounding said drum and having one end fixed to said stationary disk and the remaining end fixed to said movable disk, and means for rotating said movable disk to engage said brake band with said drum, the connection between said last-mentioned stationary disk and sleeve being adjustable whereby the stationary and movable disks may be moved longitudinally of the sleeve to expose the adjacent end of the drum.

In testimony whereof I affix my signature in presence of two witnesses.

DONALD S. MICHIE.

Witnesses:
W. J. CHAMBERLIN,
JNO. M. WHISERHUNT.